(12) United States Patent  (10) Patent No.: US 7,772,329 B2
Yang et al.  (45) Date of Patent: Aug. 10, 2010

(54) TOUGHENED NYLON, THE PROCESS OF PREPARING IT AND ITS USE

(75) Inventors: Guisheng Yang, Shanghai (CN); Tingxiu Xie, Shanghai (CN)

(73) Assignee: Shanghai Genius Advanced Material (Group) Co., Ltd., Shanghai (CN)

( * ) Notice: Subject to any disclaimer, the term of this patent is extended or adjusted under 35 U.S.C. 154(b) by 828 days.

(21) Appl. No.: 10/553,019

(22) PCT Filed: Apr. 19, 2004

(86) PCT No.: PCT/CN2004/000373

§ 371 (c)(1), (2), (4) Date: Oct. 11, 2005

(87) PCT Pub. No.: WO2004/092272

PCT Pub. Date: Oct. 28, 2004

(65) Prior Publication Data

US 2006/0205892 A1   Sep. 14, 2006

(30) Foreign Application Priority Data

Apr. 18, 2003 (CN) .............................. 03 1 16479

(51) Int. Cl.
*C08L 77/00* (2006.01)
*C08L 77/12* (2006.01)

(52) U.S. Cl. ..................... 525/432; 525/420

(58) Field of Classification Search ............... 525/420, 525/432
See application file for complete search history.

(56) References Cited

U.S. PATENT DOCUMENTS 4,714,718 A * 12/1987 Horn et al. .................. 521/134
5,242,733 A     9/1993  Windley

FOREIGN PATENT DOCUMENTS

JP       5345856       12/1993
JP       7324226       12/1995
JP      11080542        3/1999

\* cited by examiner

*Primary Examiner*—Ana L Woodward
(74) *Attorney, Agent, or Firm*—Hamre, Schumann, Mueller & Larson, P.C.

(57) ABSTRACT

A toughened nylon that comprises a matrix nylon and a long-chain nylon is described. The matrix nylon is prepared by the homopolymerization or copolymerization of cyclic lactams monomers and their corresponding amino acids. The structure of said cyclic lactams is represented by Formula (I) and the structure of amino acids is represented by (I'). In Formula (I) and (I') A is H or alkyl with 1-8 carbon and $3 \leq n \leq 11$. The long-chain nylon is selected from nylons that contain repeating units having structures represented by Formula (II), (III) or (IV). In Formula (II) D is —$(CH_2)_x$—, in which H may be substituted with $C_{1-4}$ alkyl optionally; E is —$(CH_2)_y$— or phenylene, in which H may be substituted with $C_{1-4}$ alkyl optionally; $4 \leq x \leq 34$ and $4 \leq y \leq 34$. In Formula (IV) $5 \leq u \leq 34$, $5 \leq v \leq 34$, and $u \neq v$. The proportion of said long-chain nylon in the total weight of toughened nylon is 2-45%. As the toughened nylon has very good interface combination, only one melting peak is detected with differential scanning calorimetry. Besides the preparation process and application of the toughened nylon are described hereafter too.

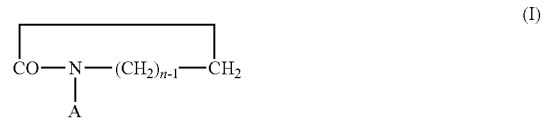

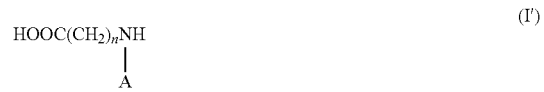

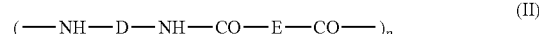

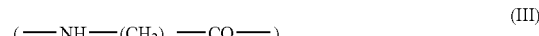

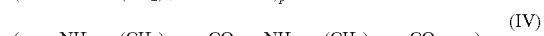

24 Claims, 6 Drawing Sheets

TOUGHENED NYLON, THE PROCESS OF PREPARING IT AND ITS USE

CROSS-REFERENCE TO RELATED APPLICATION

This Application is a Section 371 National Stage Application of International Application No. PCT/CN2004/000373, filed 19 Apr. 2004 and published as WO 2004/092272 A1 on 28 Oct. 2004, which claims the priority from the Chinese patent application 03116479.X, filed 18 Apr. 2003, the subject matter of which are hereby incorporated by reference in its entirety.

TECHNICAL SCOPE

This invention relates to a toughened nylon and its preparation and application; namely a toughened nylon prepared by matrix nylon that is toughened by long-chain nylon and its preparation processes and application.

TECHNICAL BACKGROUND

Generally nylon is toughened by rubber, such as ethylene-propylene rubber, terco-ethylene-propylene rubber, butadiene-acrylonitrile rubber, butadiene-styrene rubber, or thermoplastic elastomer, such as styrene-butadiene-styrene copolymer (SBS), styrene-ethylene-butadiene-styrene copolymer (SEBS), ethylene-vinyl acetate copolymer (EVA) and ethylene acrylic acid copolymer (EAA). However as the compatibility of these components with matrix nylon is very poor, a solubilizer must be added, such as elastomers grafted with maleic anhydride (for example, polyethylene-g-maleic anhydride (E-g-MAH), thermoplastic elastomer-g-maleic anhydride (TPE-g-MAH) and others). The nylon prepared by the above process is an alloy-polymer in morphology and the preparation process is rather complicate.

Casting nylon has high molecular weight and excellent mechanical performance. However as large-size article formed by casting process often tends to break due to poor toughness and also has high notch sensitivity, modification is necessary. In prior art the toughening method of casting nylon-6 is mainly copolymerization with dodecanolactam or modification with rubber component. Therefore the modifying agents adopted are mainly amino capped polyoxyethylene oxide, polypropylene oxide or their copolymers, amino capped liquid polybutadiene or butadiene-acrylonitrile rubber. For example, in U.S. Pat. Nos. 4,882,382, 4,994,524 and 5,189,098 casting nylon is toughened by core-shell polymer. An aqueous dispersion of polymer consisting of elastomer core and hard thermoplastic shell is prepared, and the aqueous dispersion is mixed with the aqueous solution of hexanolactam to obtain a dispersion after dehydrating. Then such dispersion, catalyst and hexanolactam are polymerized to obtain Nylon-6 toughened by rubber, in which the content of core-shell polymer is generally over 10%. The preparation process of said toughening agent is complicate and difficult in operation.

Nylon prepared by hydrolysis condensation polymerization or screw reacting extrusion is mainly toughened by rubber or reactive toughening agent with low molecular weight. Or resin prepared hereby is toughened by rubber or elastomer in screw extrusion process.

However in all said toughened nylons the rubber or thermoplastic elastomer do not dissolve in the lactam monomer of nylon, so that the rubber or elastomer exists in matrix nylon as a dispersed phase. The property of nylon depends on the extent of dispersed phase, and the crystallinity of nylon and the strength of article formed with said nylon exhibit a great reduction. Therefore it is difficult to toughen casting nylon successfully by rubber or thermoplastic elastomer as toughening agent.

INVENTION

The present invention is directed to preparing a nylon that has reinforced toughness, in the preparation of which no solubilizer is needed and no dispersed phase that may reduce the strength of material made with this nylon occurs.

Another aspect of the invention is directed to providing a simple and easy operable process for the preparation of said toughened nylon.

And yet another aspect of the invention is directed to providing the application of said toughened nylon.

In this invention a toughened nylon that comprises a matrix nylon and a long-chain nylon is described. The matrix nylon is prepared by the homopolymerization or copolymerization of cyclic lactam monomers or their corresponding amino acids. The structure of said cyclic lactam is represented by Formula (I) and the structure of amino acid is represented by (I').

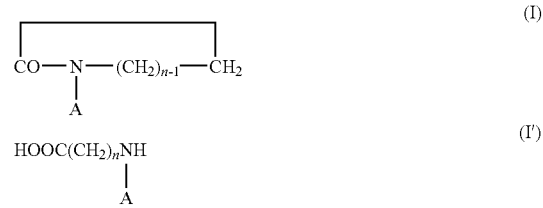

In Formula (I) and (I') A is H or alkyl with 1-8 carbon and $3 \leq n \leq 11$.

The long-chain nylon is selected from nylons that contain repeating units having structures represented by Formula (II), (III) or (IV).

In Formula (II) D is $—(CH_2)_x—$, in which H may be substituted with $C_{1-4}$ alkyl optionally; E is $—(CH_2)_y—$ or phenylene, in which H may be substituted with $C_{1-4}$ alkyl optionally; $4 \leq x \leq 34$ and $4 \leq y \leq 34$.

In Formula (III), $7 \leq w \leq 34$;

In Formula (IV), $5 \leq u \leq 34$, $5 \leq v \leq 34$, and $u \neq v$.

The proportion of said long-chain nylon in the total weight of toughened nylon is 2-45%. As the toughened nylon has very good interface combination, only one melting peak is detected with differential scanning calorimetry.

In the invention a toughened nylon that comprises a matrix nylon and a long-chain nylon is described. The matrix nylon is prepared by the homopolymerization or copolymerization of cyclic lactam monomers or their corresponding amino acids. The structure of said cyclic lactam is represented by Formula (I) and the structure of amino acid is represented by and (I').

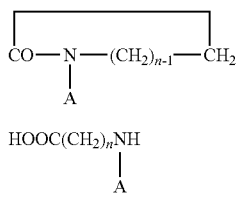

(I)

(I')

In Formula (I) and (I') A is H or alkyl with 1-8 carbon and $3 \leq n \leq 11$.

The long-chain nylon is selected from nylons that contain repeating units having structures represented by Formula (II), (III) or (IV).

$$(—NH-D-NH—CO-E-CO—)_p \qquad (II)$$

In Formula (II) D is $—(CH_2)_n—$, in which H may be substituted with $C_{1-4}$ alkyl optionally; E is $—(CH_2)_y—$ or phenylene, in which H may be substituted with $C_{1-4}$ alkyl optionally; $4 \leq x \leq 34$ and $4 \leq y \leq 34$.

$$(—NH—(CH_2)_w—CO—)_p \qquad (III)$$

In Formula (III), $7 \leq w \leq 34$ $$(—NH—(CH_2)_u—CO—NH—(CH_2)_v—CO—)_p \qquad (IV)$$

In Formula (IV), $5 \leq u \leq 34$, $5 \leq v \leq 34$, and $u \neq v$.

The said toughened nylon is prepared by the polymerization of said cyclic lactam monomer in the existence of said long-chain nylon as toughening agent. The proportion of said long-chain nylon used as toughening agent in the total weight of toughened nylon is 2-45%.

In the technical program of this invention the optimized proportion of long-chain nylon in the total weight of toughened nylon is 6-25%. The cyclic lactam monomer is selected from one or more following monomers: butanolactam, pentanolactam, hexanolactam, heptanolactam, octanolactam, nonanolactam, decanolactam, undecanolactam, dodecanolactam, N-methyl hexanolactam, N-n-octyl nonanolactam, N-t-butyl dodecanolactam; the corresponding amino acid is ω-amino butanoic acid, ω-amino pentanoic acid, ω-amino hexanoic acid, ω-amino heptanoic acid, ω-amino octanoic acid, ω-amino nonanoic acid, ω-amino decanoic acid, ω-amino undecanoic acid or ω-amino dodecanoic acid; the said long-chain nylon is selected from one or more following nylons: nylon-1010, nylon-1111, nylon-1212, nylon-1313, nylon-46, nylon-66, nylon-610, nylon-612, nylon-613, nylon-1011, nylon-1012, nylon-1213, nylon-8, nylon-9, nylon-11, nylon-12, nylon-13, poly(2,2,4-trimethyl hexamethylene terephthalamide), poly(3-t-butyl-hexanedioyl heptamethylene diamine), co-condensation nylon 6/7, co-condensation nylon 6/10, co-condensation nylon 6/12, co-condensation nylon 6/13, co-condensation nylon 10/11, co-condensation nylon 10/12, co-condensation nylon 12/13, nylon-6T and nylon-10T.

A preparation process of said toughened nylon is described in this invention, the steps of which are as follows: dissolve said long-chain nylon resin in said lactam monomer or its corresponding amino acid. The polymerization of said lactam monomer or its corresponding amino acid is carried out. The dissolution step and the polymerization step may be conducted simultaneously. Or dissolve at first and then carry out polymerization in the solution obtained.

With regard to the preparation process of this invention, it is preferred that the said polymerization is carried out with one of such processes as casting, reacting extrusion, hydrolysis polymerization or solid phase polymerization.

The steps of casting process are as follows: dissolve said long-chain nylon in melted cyclic lactam monomer or its corresponding amino acid; dehydrate; then add catalyst and dehydrate again, raise temperature to 120-200° C. and add catalyst promoter; immediately transfer into preheated mould and polymerize in an oven at 150-250° C. to obtain toughened nylon.

The steps of reacting extrusion process are as follows: add and dissolve said long-chain nylon in cyclic lactam monomer or its corresponding amino acid in a reactor; dehydrate in vacuum; add catalyst and continue to dehydrate in vacuum; add cyclic lactam monomer or its corresponding amino acid and catalyst promoter in another reactor, dehydrating in vacuum. Add the contents of two reactors into an extruder for polymerization; set the temperature of polymerization section at 220-250° C. and adjust screw speed so that the residence time of material in screw is 0.5-7 minutes. Toughened nylon is provided as extruded product.

The steps of hydrolysis polymerization process are as follows: add said long-chain nylon resin to cyclic lactam monomer or its corresponding amino acid, heat and dissolve, add water and conduct hydrolysis polymerization at 200-250° C. and 10-20 MPa, depressurize after 0.5-6 hours and dehydrate in vacuum, continue polymerization for further increasing viscosity, and then toughened nylon is obtained.

The present invention also provides the application of said toughened nylon in the manufacture of gears, bearings, precise instrumental parts and automobile parts.

In this present invention a toughen nylon is obtained by matrix nylon that is prepared by the homopolymerization or copolymerization of cyclic lactam and is toughened by long-chain nylon. This obtained nylon exhibits reinforced toughness, excellent tensile strength, breaking elongation and notched impact strength as well good cold resistance as the reduction of toughness at −40° C. is still acceptable. No solubilizer is needed in the process and there is not any dispersed phase in matrix nylon, which may reduce the strength of material and is well known in much prior art. As long-chain nylon is dissolvable in lactam monomer, the preparation of toughened nylon provided in this invention is easy and simple in operation, needing no solubilizer or other means to improve the compatibility of toughening agent with matrix nylon.

DETAILS OF IMPLEMENTATION

Figure 1:
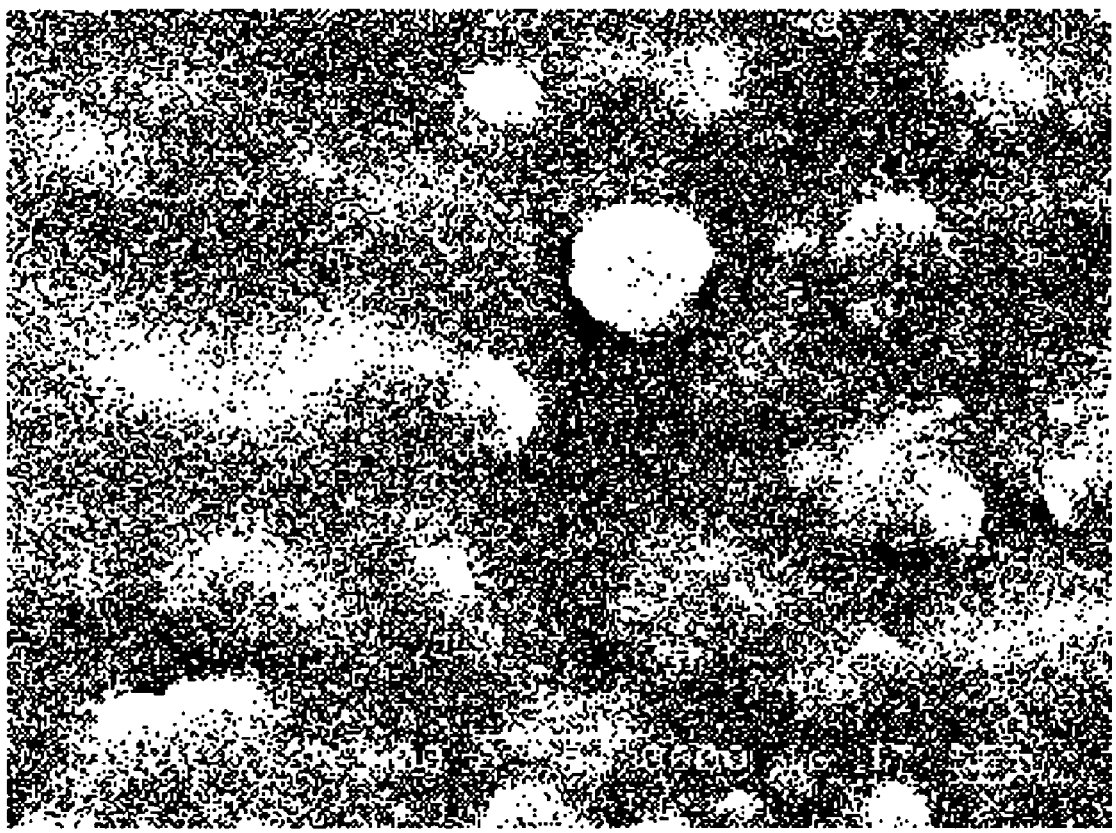
FIG. 1 is the electron microscope photo of product prepared with the invention by adding 8% (wt. %, based on the total weight of toughened nylon) of nylon 1212 resin in hexanolactam monomer, at 30000 times of magnification.

The term "matrix nylon" in this invention refers to the toughened part of toughened nylon, which is prepared by the homopolymerization or copolymerization of cyclic lactam monomer and their corresponding amino acid. The structure of said cyclic lactam is represented by Formula (I) and the structure of said amino acid is represented by Formula (I').

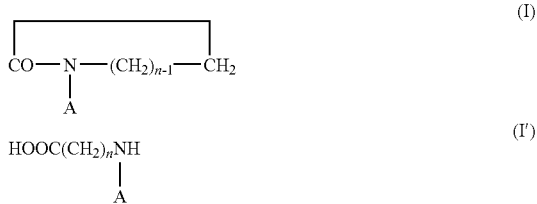

In Formula (I) and (I') A is H or alkyl with 1-8 carbon and $3 \leq n \leq 11$.

The said cyclic lactam monomers include butanolactam, pentanolactam, hexanolactam, heptanolactam, octanolactam, nonanolactam, decanolactam, undecanolactam, dodecanolactam, N-methyl hexanolactam, N-n-octyl nonanolactam and N-t-butyl dodecanolactam, but hexanolactam is preferred; the said corresponding amino acids include ω-amino butanoic acid, ω-amino pentanoic acid, ω-amino hexanoic acid, ω-amino heptanoic acid, ω-amino octanoic acid, ω-amino nonanoic acid, ω-amino decanoic acid, ω-amino undecanoic acid or ω-amino dodecanoic acid. The matrix nylon may be prepared by the homopolymerization of any cyclic lactam monomer or its corresponding amino acid, such as nylon-4, nylon-5, nylon-6, nylon-7, nylon-8, nylon-9, nylon-10, nylon-11 and nylon-12. The matrix nylon may also be prepared by the copolymerization of any cyclic lactam monomer or its corresponding amino acid, such as co-condensation nylon 4/6 (which may be prepared by the condensation polymerization of ω-amino butanoic acid and ω-amino hexanoic acid), co-condensation nylon 6/10, co-condensation nylon 6/9 and co-condensation nylon 6/12.

The term "long-chain nylon" in this invention refers to nylon in which the carbon atom number of main chain in repeated units is 8 at least, including the nylons containing repeated units represented by Formula (II), (III) and (IV).

In Formula (II) D is $—(CH_2)_x—$, in which H may be substituted with $C_{1-4}$ alkyl optionally; E is $—(CH_2)_y—$ or phenylene, in which H may be substituted with $C_{1-4}$ alkyl optionally; $4 \leq x \leq 34$ and $4 \leq y \leq 34$.

In Formula (III), $7 \leq w \leq 34$;

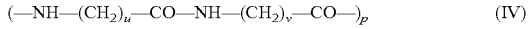

In Formula (IV) $5 \leq u \leq 34$, $5 \leq v \leq 34$, and $u \neq v$.

The carbon atom number of main chain in the repeated units of long-chain nylon that is used as toughening agent in this invention should be 8 at least, or 10 is preferred. The said long-chain nylon may be a nylon containing repeating units represented by Formula (II), (III) and (IV). The following nylons are preferred, such as nylon-1010, nylon-1111, nylon-1212, nylon-1313, nylon-46, nylon-66, nylon-610, nylon-612, nylon-613, nylon-1011, nylon-1012, nylon-1213, poly(telephtaloyl-2,2,4-trimethyl hexamethylene diamine), poly(3-t-butyl-hexanedioyl heptamethylene diamine), nylon-8, nylon-9, nylon-11, nylon-12, nylon-13, co-condensation nylon 6/7, co-condensation nylon 6/10, co-condensation nylon 6/12, co-condensation nylon 6/13, co-condensation nylon 10/11, co-condensation nylon 10/12, co-condensation nylon 12/13, nylon-6T, nylon-10T and their combinations. There is not any restriction for the molecular weight of long-chain nylon, but the long-chain nylon should be dissolvable in cyclic lactams or corresponding amino acids.

In this invention long-chain nylon is adopted as toughening agent to replace rubber or thermoplastic elastomer in prior art. The advantage of long-chain nylon is to be dissolvable in nylon polymerized with cyclic lactam monomers or their corresponding amino acids, which may be either homopolymer or copolymer. As long-chain nylon and matrix nylon have similar structure containing amido bond, they have good compatibility with each other, namely good interface combination. Meanwhile as the main chain of repeated units in long-chain nylon has at least 8 carbon atoms, the density of hydrogen bond, crystallization procedure and crystallinity are changed accordingly. Hence the toughness of nylon is greatly reinforced by the unique structure. The adding amount of long-chain nylon depends on different processes and performance requirements, and it usually is 2-45% of total weight of toughened nylon, and 6-25% is preferred.

The toughened nylon mentioned in this invention may be prepared by a simple practicable process, such as anion initiate polymerization of casting monomer, single (double) screw reacting extrusion and hydrolysis condensation polymerization.

In casting process long-chain nylon used as toughening agent is directly dissolved in cyclic lactam monomer or its corresponding amino acid, dehydrate in vacuum, add catalyst and catalyst promoter, cast into a mould and polymerize to obtain toughened nylon.

In reacting extrusion process long-chain nylon dissolved in cyclic lactam monomer or its corresponding amino acid, which and another batch of cyclic lactam monomer or its corresponding amino acid containing catalyst promoter are transferred separately into a mixer for mixing with metering pumps. Then the mixture is fed into an extruder (single or double screw extruder) and the extruded product is toughened nylon.

In hydrolysis polymerization process, long-chain nylon and cyclic lactam monomer or its corresponding amino acid are added into a polymerization kettle; hydrolysis polymerization is carried out at high temperature (for example 200-250° C.) while stirring. Raise the viscosity of resin in vacuum. Then discharge under pressure after 0.2-6 hours and cut toughened nylon into pellets. Besides, high molecular weight nylon may be obtained by further solid phase condensation polymerization of the toughened nylon.

In case ω-amino acid is used as matrix nylon monomer, toughened nylon is prepared by solid phase polymerization. The detail steps are as follows: add long-chain nylon to ω-amino acid and conduct condensation polymerization at 200-250° C., then conduct solid phase condensation polymerization at 150-200° C. and in vacuum to further increase molecular weight. After 6-24 hours toughened nylon is obtained.

In these processes mentioned above the kinds and amounts of catalyst and catalyst promoter are readily defined by technical personnel skilled in the art. Among the preferred catalysts are sodium hydroxide, potassium hydroxide, sodium alkoxide and Grignard reagent, and among the preferred catalyst promoters are isocyanate, acyl amide, acyl chloride, carbonate, polyester and urea, particularly such as 2,4-tolune diisocyanate (TDI), acetyl acetamide, acetyl chroride, dimethyl carbonate and polyethylene telephthalate (PET). It is preferred that the amount of catalyst is 0.0005-10% (wt.) and the amount of catalyst promoter is 0.005-4% (wt), or 0.02-2% (wt.) better, based on the weight of cyclic lactam monomer or its corresponding amino acid. In hydrolysis polymerization the amount of adding water is 10-100% (wt.), based on the weight of cyclic lactam monomer or its corresponding amino acid.

In the preparation processes mentioned in the invention, the time to add long-chain nylon to cyclic lactam monomer or its corresponding amino acid depends on actual polymerization process adopted. In casting process long-chain nylon has to be dissolved in cyclic lactam monomer or its corresponding amino acid before cast polymerization. In reacting extrusion process, long-chain nylon is dissolved in a part of cyclic lactam monomer or its corresponding amino acid firstly, and another part of cyclic lactam monomer or its corresponding amino acid is then added during reacting extrusion. In hydrolysis polymerization in a reaction kettle, long-chain nylon may be dissolved in cyclic lactam monomer or its corresponding amino acid before polymerization or be directly added during hydrolysis polymerization.

Figure 3:
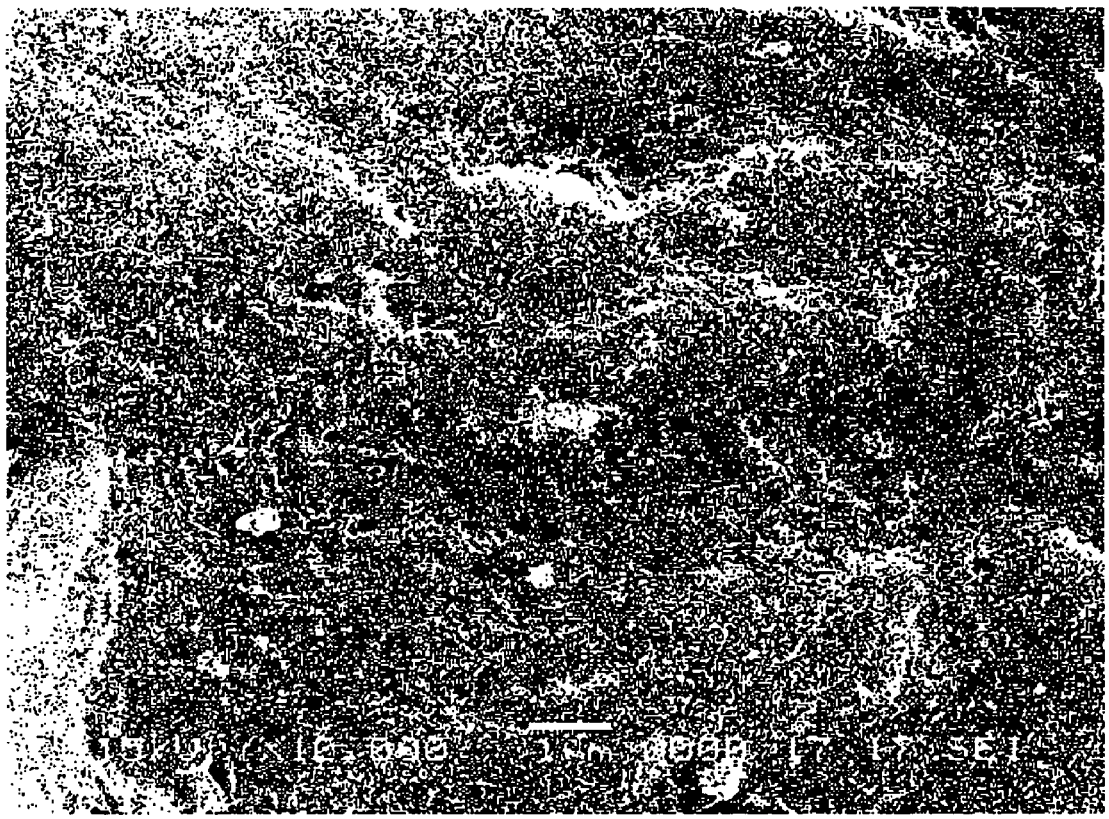
FIG. 3 is the electron microscope photo of pure and non-toughened nylon 6 prepared with a prior art, at 10000 times of magnification.
Figure 4:
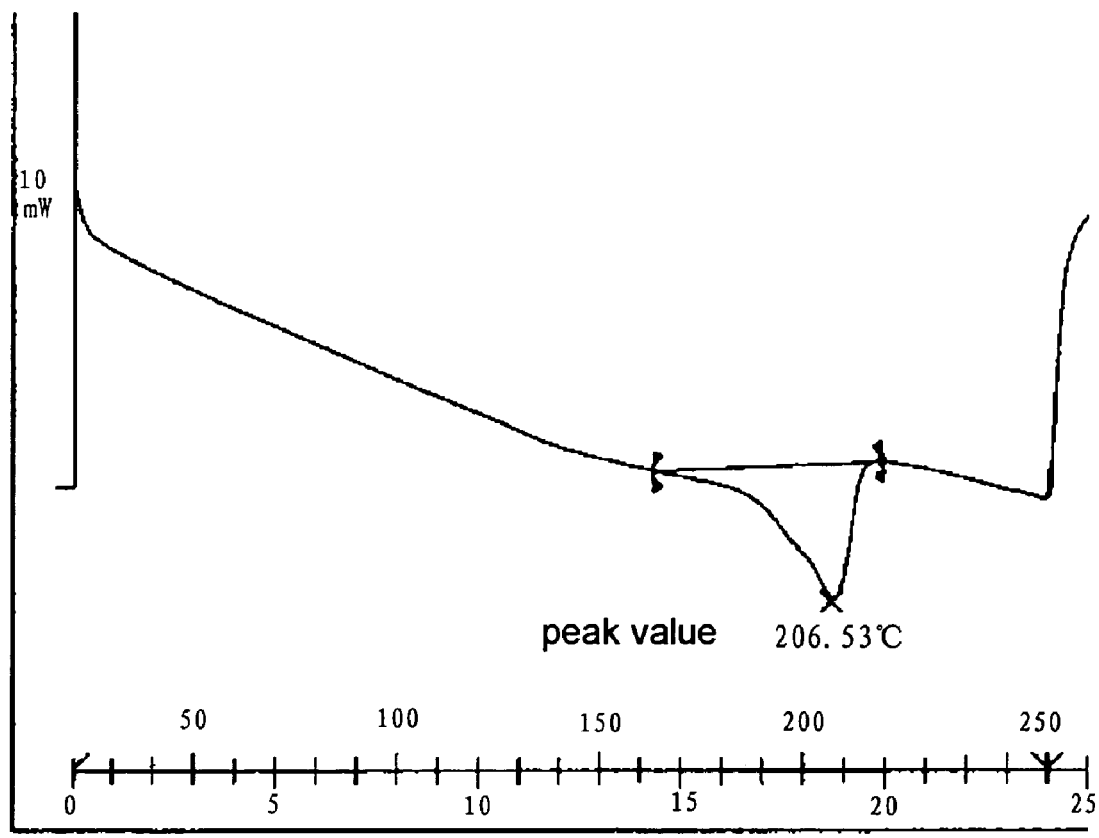
FIG. 4 is the deferential scanning calorimetry (DSC) spectrum of nylon 6 toughened by nylon 1212 with the invention.
Figure 5:
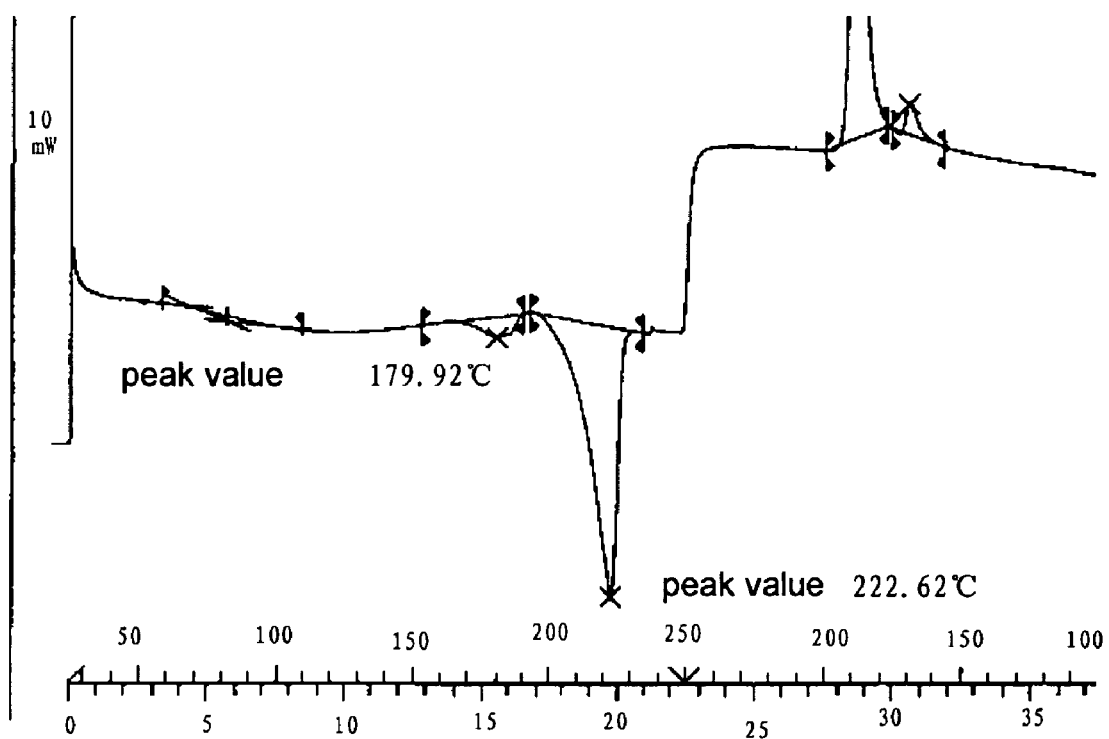
FIG. 5 is the deferential scanning calorimetry (DSC) spectrum of the commixture of nylon 6 and nylon 1212.
Figure 6:
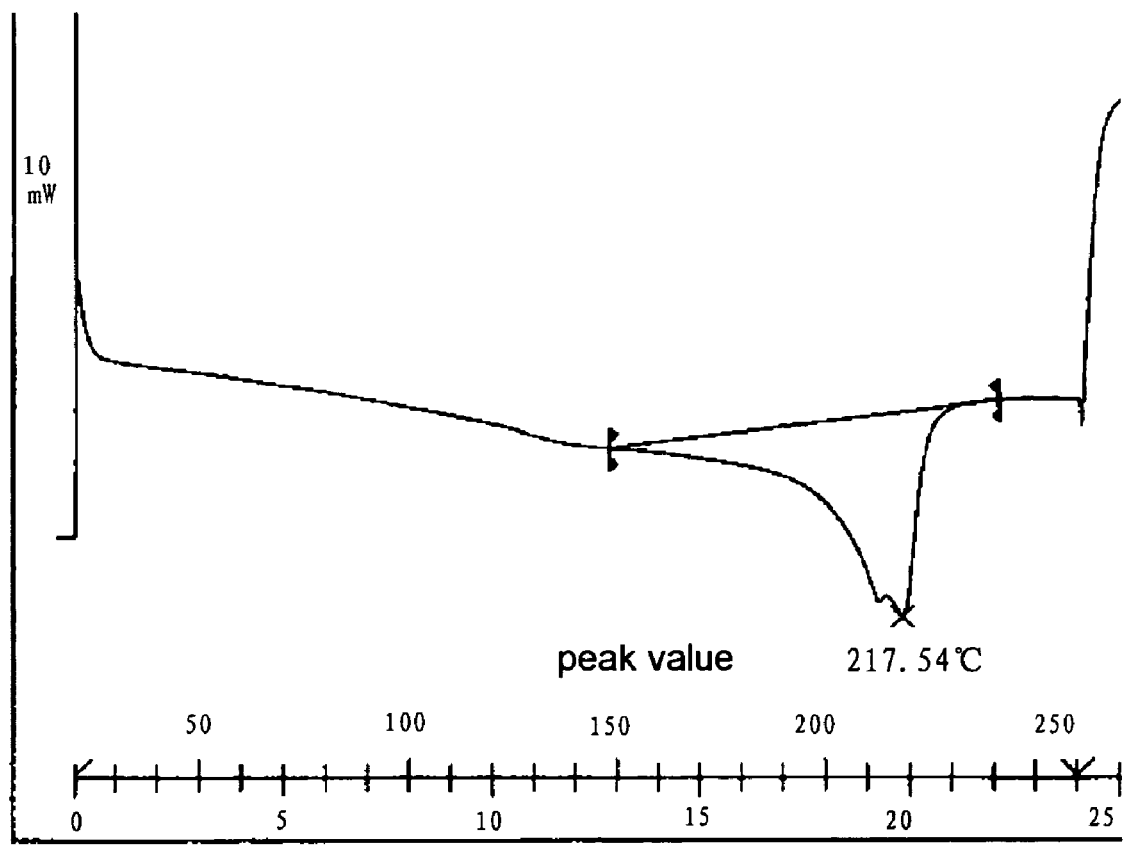
FIG. 6 is the deferential scanning calorimetry (DSC) spectrum of pure nylon 6.

An aspect of the invention is directed to a matrix nylon toughened by long-chain nylon. The long-chain nylon used as toughening agent is dissolved in melted cyclic lactam monomer or its corresponding amino acid, so that long-chain nylon is dispersed into polymer system as single molecules and a homogenous phase system is formed. In FIG. 4 to 6, there is only one melting peak in the deferential scanning calorimetry (DSC) spectrum of the toughen nylon system prepared by this invention, but there are two melting peaks in the deferential scanning calorimetry (DSC) spectrum of the mixture system of matrix nylon and long-chain nylon, which confirms the homogenous nature of toughened nylon system. From scanning electronic microscope photos shown in FIG. 1 to 3, it is obvious that the crystal morphology of toughened nylon is different from that of normal nylon, which greatly improves the toughness and breaking elongation of matrix nylon.

Another aspect of the invention is directed to the preparation of homogenous solution suitable for the casting and reacting extrusion processes of nylon preparation by using long-chain nylon as toughening agent as it is dissolvable in cyclic lactam monomer or its corresponding amino acid. Rubber is often used to toughen nylon in much prior art, but as rubber is essentially not dissolvable in cyclic lactam monomer, only screw excursion process is suitable for the preparation of nylon toughened by rubber. Besides a solubilizer must be added to improve the compatibility of rubber with matrix nylon.

The following examples intend to give further explanation for this invention. However it should be remind that this invention is by no means restricted by these examples. The parts and percentages in these examples are based on weight, unless specified otherwise.

Example 1

Casting

Dissolve 8 parts of nylon-1212 in 92 parts of melted hexanolactam monomer while stirring and dehydrate in vacuum for 0.5 hour; add 0.2% of sodium hydroxide (based on the weight of monomer), dissolve and dehydrate in vacuum to obtain sodium amide used as catalyst; raise temperature to 140° C. and add 0.4% of 2,4-tolune diisocyanate (TDI); immediately transfer into a mould preheated at 165° C. and then conduct polymerization in an oven at 170° C. to obtain casting nylon-6 toughened by nylon-1212. The mechanical properties of toughened nylon system are listed in Table 1 and its electronic microscope photos and deferential scanning calorimetry (DSC) spectrums are shown in FIGS. 1 and 4 respectively.

Example 2

Extrusion

Figure 2:
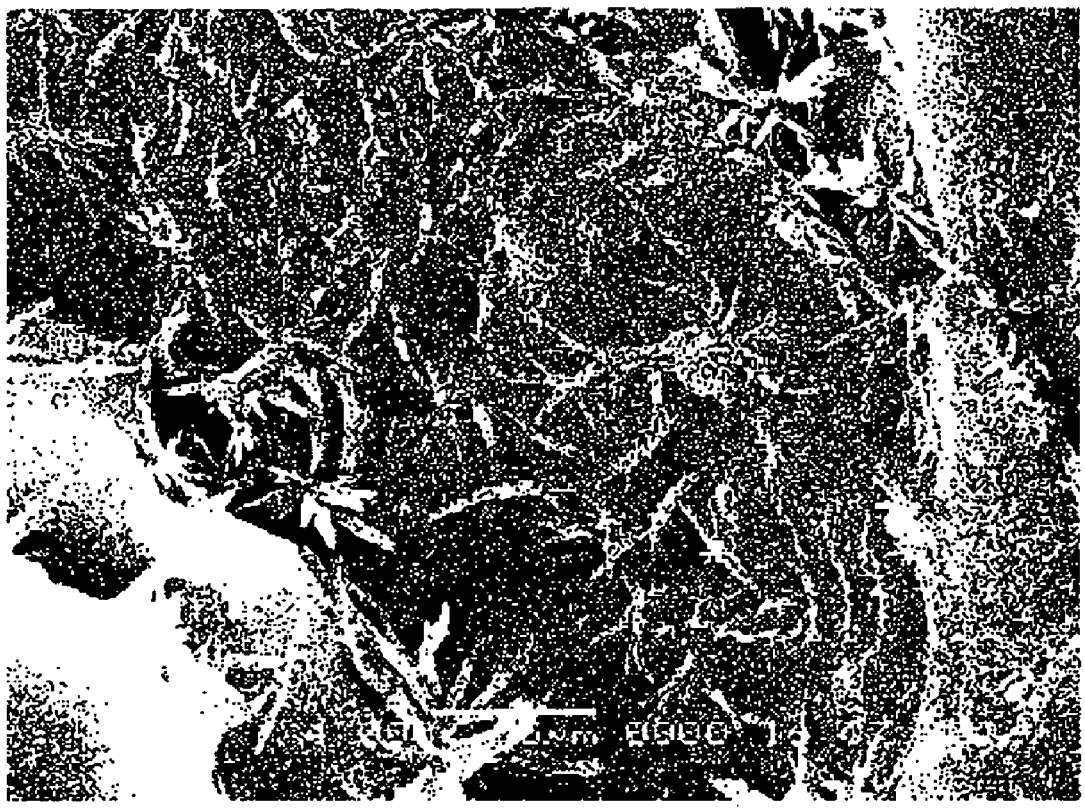
FIG. 2 is the electron microscope photo of product prepared with the invention by adding 10% (wt. %, based on the total weight of toughened nylon) nylon 1212 resin in hexanolactam monomer, at 4000 times of magnification.

Add 10 parts of powder nylon-1212 to 70 parts of hexanolactam monomer in a reaction kettle and dissolve at 140° C.; dehydrate in this stainless steel kettle in vacuum; add 0.2% of sodium hydroxide (based on the weight of monomer) and continue to dehydrate in vacuum; in another reaction kettle add 20 parts of hexanolactam monomer and 0.4% of TDI (based on the weight of monomer) and dehydrate in vacuum; transfer the contents of two reactors into a double screw extruder with metering pumps; adjust the temperature of polymerization section at 240° C. and control the speed of screw so that the residence time of material in screw is 1-3 minutes. The product is reacting extrusion nylon-6 toughened by nylon-1212. The mechanical properties of toughened nylon system are listed in Table 1 and its electronic microscope photo is shown in FIG. 2.

Example 3

Solid Phase Condensation Polymerization

Add 5 parts of nylon-46 chip to 50 parts of ω-amino butanoic acid and 45 parts of ω-amino hexanoic acid; conduct condensation polymerization at 230° C.; then carry out solid phase condensation polymerization at 160° C. to further increase its molecular weight; obtain co-condensation nylon 4/6 modified by nylon-46 after 24 hours. The mechanical properties of toughened nylon system are listed in Table 1

Example 4

Hydrolysis

Add 10 parts of nylon-1012 and 9 parts of deionized water to 90 parts of N-methyl hexanolactam monomer; raise pressure to 12 MPa and temperature to 230° C.; conduct hydrolysis polymerization for 4 hours; then depressurize and continue polymerization in vacuum for 2 hours; discharge by filling nitrogen and cut product into pellets to obtain poly(N-methyl hexanolactam) toughened by nylon-1012. The mechanical properties of toughened nylon system are listed in Table 1

Example 5

Casting

Dissolve 6 parts of nylon-3436 in 94 parts of butanolactam while heating; dehydrate for 30 minutes in vacuum; add 0.0005% of potassium hydroxide (based on the weight of monomer) and further dehydrate for 20 minutes; when the temperature of solution reaches 120° C. add 0.02% of acetyl acetamide (based on the weight of monomer) and stir uniformly; immediately transfer into a mould preheated at 180° C. and then put into an oven at 180° C. for polymerization to obtain nylon-4 toughened by nylon-3436. The mechanical properties of toughened nylon system are listed in Table 1

Example 6

Casting

Dissolve 2 parts of poly(telephtaloyl-2,2,4-trimethyl hexamethylene diamine) in 98 parts of melted butanolactam monomer while stirring; dehydrate in vacuum for 0.5 hour; then add 2% of potassium hydroxide (based on the weight of monomer) and dehydrate and dissolve in vacuum to obtain sodium amide that is used as catalyst; raise temperature to 160° C. and add 2% of acetyl chloride (based on the weight of monomer); immediately transfer into a mould preheated at 200° C.; conduct polymerization in an oven at 200° C. to obtain casting nylon-4 toughened by poly(telephtaloyl-2,2,4-trimethyl hexamethylene diamine). The mechanical properties of toughened nylon system are listed in Table 1.

Example 7

Casting

Dissolve 25 parts of nylon-8 in 75 parts of octanolactam while heating; dehydrate in vacuum for 30 minutes; add 5% of sodium alkoxide (based on the weight of monomer) and further dehydrate for 20 minutes; when the temperature of solution reaches 200° C. add 4% of urea (based on the weight of monomer) and stir uniformly; immediately transfer into a mould preheated at 250° C. and then put into an oven at 250° C. for polymerization to obtain casting nylon-8 toughened by nylon-8. The mechanical properties of toughened nylon system are listed in Table 1.

Example 8

Casting

Dissolve 15 parts of poly(3-t-butyl-hexanedioyl heptamethylene diamine) in 85 parts of nonanolactam while heating; dehydrate for 30 minutes; add 10% of Grignard reagent (based on the weight of monomer) and further dehydrate for 20 minutes; when the temperature of solution reaches 130° C. add 4% of TDI (based on the weight of monomer) and stir uniformly; immediately transfer into a mould preheated at 150° C. and then put into an oven at 150° C. for polymerization to obtain casting nylon-9 modified by poly(3-t-butyl-hexanedioyl heptamethylene diamine). The mechanical properties of toughened nylon system are listed in Table 1.

Example 9

Hydrolysis

Add 45 parts of nylon-13 chip to 55 parts of N-n-octyl nonanolactam monomer and dissolve at 140° C.; add 25 parts of deionized water and conduct hydrolysis polymerization at 250° C. and 20 MPa; depressurize after a half hour and dehydrate in vacuum; continue polymerization to further increase viscosity; after 6 hours discharge with pressure and cut the product into pellets to obtain poly(N-n-octyl nonanolactam) toughened by nylon-13. The mechanical properties of toughened nylon system are listed in Table 1.

Example 10

Hydrolysis

Add 30 parts of nylon-24 chip to 70 parts of decanolactam monomer and dissolve at 140° C.; add 70 parts of deionized water and conduct hydrolysis polymerization at 200° C. and 10 MPa; depressurize after 6 hours and dehydrate in vacuum; continue polymerization to further increase viscosity; after 0.2 hours discharge with pressure and cut product into pellets to obtain hydrolysis condensation nylon-10 toughened by nylon-24. The mechanical properties of toughened nylon system are listed in Table 1.

Example 11

Casting

Dissolve 10 parts of co-condensation nylon 6/7 resin in 90 parts of decanolactam while stirring; dehydrate in vacuum for 0.5 hour; add 0.02% of potassium hydroxide (based on the weight of monomer), dissolve and dehydrate in vacuum to prepare sodium amide that is used as catalyst; raise temperature to 140° C. and add 0.005% of TDI (based on the weight of monomer); immediately transfer into a mould preheated at 165° C. and conduct polymerization in an oven at 170° C. to obtain casting nylon-10 toughened by co-condensation nylon 6/7. The mechanical properties of toughened nylon system are listed in Table 1.

Example 12

Extrusion

Add 15 parts of nylon 6T powder to 100 parts of dodecanolactam monomer in a reactor kettle and dissolve at 100° C.; dehydrate in vacuum in the stainless steel kettle; add 3% of sodium hydroxide (based on the weight of monomer) and further dehydrate in vacuum; in another reactor add 20 parts of dodecanolactam monomer and 2.5% of dimethyl carbonate (based on the weight of monomer) and dehydrate in vacuum; add the contents of two reactors into a double screw extruder with metering pumps; adjust the temperature of polymerization section at 250° C. and control the speed of screw so that the residence time of material in screw is 0.5-2 minutes to obtain reacting extrusion nylon-12 toughened by nylon 6T. The mechanical properties of toughened nylon system are listed in Table 1.

Example 13

Solid Phase Condensation

Add 10 parts of co-condensation nylon 10/12 chip to 50 parts of ω-amino hexanoic acid and 50 parts of ω-amino octanoic acid; conduct condensation polymerization at 200° C.; then carry out solid phase condensation polymerization at 150° C. to further increase molecular weight; thus after 12 hours co-condensation nylon 6/8 modified by co-condensation nylon 10/12 is obtained. The mechanical properties of toughened nylon system are listed in Table 1.

Example 14

Extrusion

Add 20 parts of co-condensation nylon 20/34 to 100 parts of N-t-butyl dodecanolactam monomer in a reactor kettle and dissolve at 120° C.; dehydrate in vacuum in this stainless steel kettle; add 0.002% of sodium hydroxide (based on the weight of monomer) and continue to dehydrate in vacuum; in another reactor add 20 parts of N-t-butyl dodecanolactam monomer and 0.01% of PET (based on the weight of monomer) and dehydrate in vacuum; add the contents of two reactors into a single screw extruder with metering pumps; and adjust the temperature of polymerization section at 220° C. and control the speed of screw so that the residence time of material in screw is 5-7 minutes to obtain reacting extrusion poly(N-t-butyl dodecanolactam) toughened by co-condensation nylon 20/34. The mechanical properties of toughened nylon system are listed in Table 1.

Example 15

Solid Phase Condensation

Add 5 parts of nylon 1010 chip to 95 parts of ω-amino undecanoic acid monomer; conduct condensation polymerization at 250° C. and then carry out solid phase condensation polymerization in vacuum at 200° C. to further increase molecular weight; after 6 hours nylon 11 toughened by nylon 1010 is obtained. The mechanical properties of toughened nylon system are listed in Table 1.

Example 16

Casting

Dissolve 8 parts of nylon-66 in 92 parts of melted hexanolactam monomer while stirring and dehydrate in vacuum for 0.5 hour; add 0.2% of sodium hydroxide (based on the weight of monomer), dissolve and dehydrate in vacuum to obtain sodium amide used as catalyst; raise temperature to 140° C. and add 0.03% of 2,4-tolune diisocyanate (TDI); immediately transfer into a mould preheated at 165° C. and then conduct polymerization in an oven at 170° C. to obtain casting nylon-6 toughened by nylon-66. The mechanical properties of toughened nylon system are listed in Table 1.

What is claimed is:

1. A toughened nylon, comprising:
   a matrix nylon; and
   a long-chain nylon,
   the matrix nylon is prepared by homopolymerization or copolymerization of cyclic lactam monomers or their corresponding amino acids, the structure of said cyclic lactam is represented by Formula (I) and the structure of said amino acid is represented by Formula (I');

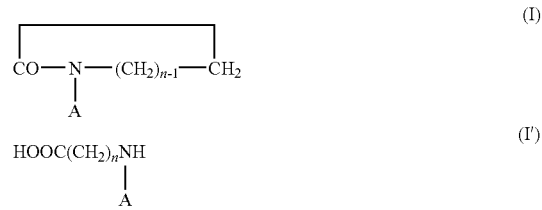

in Formula (I) and (I') A is an alkyl group including 1-8 carbon(s) and $3 \leq n \leq 11$;

the long-chain nylon is at least one selected from the group consisting of nylon-1010, nylon-1111, nylon-1212, nylon-1313, nylon-46, nylon-66, nylon-610, nylon-612, nylon-613, nylon-1011, nylon-1012, nylon-1213, nylon-8, nylon-9, nylon-11, nylon-12, nylon-13, poly(2,2,4-trimethyl hexamethylene terephthalamide), co-condensation nylon 6/7, co-condensation nylon 6/10, co-condensation nylon 6/12, co-condensation nylon 6/13,

TABLE 1

| Ex. | Matrix nylon monomer | Long-chain nylon | Tensile strength (MPa) | Breaking elongation (%) | Notched impact strength (J/m) | Impact strength at −40° C. (J/m) |
|---|---|---|---|---|---|---|
| 1 | Hexanolactam | Nylon-1212 | 45 | 546 | 236 | 215 |
| 2 | Hexanolactam | Nylon-1212 | 61.5 | 430 | 189 | 153 |
| 3 | ω-amino butanoic acid ω-amino hexanoic acid | Nylon-46 | 64 | 173 | 121 | 103 |
| 4 | N-methyl hexanolactam | Nylon-1012 | 52 | 720 | 459 | 423 |
| 5 | Butanolactam | Nylon-3436 | 51 | 432 | 323 | 279 |
| 6 | Butanolactam | Poly(telephtaloyl-2,2,4-trimethyl-hexa methylene diamine) | 53 | 315 | 249 | 207 |
| 7 | Octanolactam | Nylon-8 | 47 | 470 | 537 | 523 |
| 8 | Nonanolactam | Poly(3-t-butyl-hexa nedioyl hepta-methylene diamine) | 45 | 723 | 578 | 517 |
| 9 | N-n-octyl nonanolactam | Nylon-13 | 40 | 780 | 673 | 638 |
| 10 | Decanolactam | Nylon-24 | 40 | 780 | 753 | 724 |
| 11 | Decanolactam | Co-condensation Nylon 6/7 | 45 | 670 | 573 | 552 |
| 12 | Dodecanolactam | Nylon 6T | 44 | 420 | 483 | 472 |
| 13 | ω-amino hexanoic acid ω-amino octanoic acid | Co-condensation Nylon 10/12 | 52 | 453 | 354 | 323 |
| 14 | N-t-butyl dodecanolactam | Co-condensation Nylon 20/34 | 40 | 820 | 728 | 709 |
| 15 | ω-amino undecanoic acid | Nylon-1010 | 38 | 652 | 615 | 527 |
| 16 | Hexanolactam | Nylon-66 | 55 | 532 | 213 | 195 |
| | The properties of several nylons in prior art | | | | | |
| | Nylon-4 | | — | 36 | — | — |
| | Nylon-6 | | 60-65 | 30 | 50-70 | 40-60 |
| | Nylon-9 | | 58-65 | 182 | 250-300 | — |
| | Nylon-11 | | 45-55 | 10-27 | 250-350 | — |

Note:
The determination procedures for various properties in the Table are ASTM-D638 for tensile strength and breaking elongation and ASTM-D256 for notched impact strength.

co-condensation nylon 10/11, co-condensation nylon 10/12, co-condensation nylon 12/13, nylon-6T and nylon-10T; and a proportion of said long-chain nylon in the total weight of the toughened nylon is 2-45%; as the toughened nylon has only one melting peak detected with differential scanning calorimetry.

2. The toughened nylon according to claim 1, wherein the proportion of said long-chain nylon in the total weight of the toughened nylon is 6-25%.

3. The toughened nylon according to claim 1, wherein said cyclic lactam monomer is at least one selected from the group consisting of N-methyl hexanolactam, N-n-octyl nonanolactam, and N-t-butyl dodecanolactam.

4. A preparation process of toughened nylon according to claim 1, the preparation process comprising:
   a dissolution step of said long-chain nylon resin in said lactam monomer or its corresponding amino acid; and
   a polymerization step of said lactam monomer or its corresponding amino acid;
   wherein the dissolution step and the polymerization step are conducted simultaneously, or wherein the dissolution step is performed and then the polymerization step is carried out in a solution obtained from the dissolution step.

5. The preparation process according to claim 4, wherein said polymerization step includes a casting process.

6. The preparation process according to claim 4, wherein said polymerization step includes a casting process, such that the preparation process comprises:
   dissolving said long-chain nylon resin in melted cyclic lactam monomer or its corresponding amino acid;
   dehydrating;
   then adding catalyst and dehydrating again, raising the temperature to 120-200° C. and adding catalyst promoter to obtain a resulting contents;
   transferring the resulting contents into a preheated mould immediately and carrying out polymerization in an oven at 150-250° C. to obtain the toughened nylon.

7. The preparation process according to claim 4, wherein said polymerization step includes a reacting extrusion process, such that the preparation process comprises:
   adding and dissolving said long-chain nylon resin in cyclic lactam monomer or its corresponding amino acid as contents in a first reactor;
   dehydrating in vacuum the contents in the first reactor;
   in the first reactor, adding a catalyst and continue dehydrating in vacuum;
   adding cyclic lactam monomer or its corresponding amino acid and a catalyst promoter as contents in a second reactor, and dehydrating in vacuum;
   then adding the contents of the first and the second reactors into an extruder for polymerization; and
   setting the temperature of polymerization section at 220-250° C. and adjusting a screw speed so that a residence time of material in a screw is 0.5-7 minutes, and the toughened nylon is obtained as an extruded product.

8. The preparation process according to claim 4, wherein said polymerization step includes a hydrolysis polymerization process, such that the preparation process comprises:
   adding said long-chain nylon resin to cyclic lactam monomer or its corresponding amino acid;
   heating and dissolving;
   adding water and conducting hydrolysis polymerization at 200-250° C. and 10-20 MPa;
   depressurizing after 0.5-6 hours and dehydrating in vacuum; and
   continuing polymerization to further increase viscosity to obtain the toughened nylon.

9. The preparation process according to claim 4, wherein said polymerization step includes reacting extrusion.

10. The preparation process according to claim 4, wherein said polymerization step includes hydrolysis polymerization.

11. The preparation process according to claim 4, wherein said polymerization step includes solid phase polymerization.

12. Gears, bearings, precise instrumental parts and automobile parts comprising the toughened nylon prepared according to claim 1.

13. A toughened nylon, comprising:
   a matrix nylon; and
   a long-chain nylon,
   the matrix nylon is prepared by the homopolymerization or copolymerization of cyclic lactam monomers or their corresponding amino acids, the structure of said cyclic lactam is represented by Formula (I) and the structure of said amino acid is represented by Formula (I');

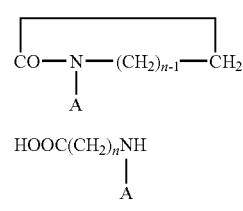

in Formula (I) and (I') A is an alkyl group including 1-8 carbon(s) and $3 \leq n \leq 11$;

the long-chain nylon is at least one selected from the group consisting of nylon-1010, nylon-1111, nylon-1212, nylon-1313, nylon-46, nylon-66, nylon-610, nylon-612, nylon-613, nylon-1011, nylon-1012, nylon-1213, nylon-8, nylon-9, nylon-11, nylon-12, nylon-13, poly(2,2,4-trimethyl hexamethylene terephthalamide), co-condensation nylon 6/7, co-condensation nylon 6/10, co-condensation nylon 6/12, co-condensation nylon 6/13, co-condensation nylon 10/11, co-condensation nylon 10/12, co-condensation nylon 12/13, nylon-6T and nylon-10T; and the toughened nylon is prepared by the polymerization of said cyclic lactam monomer or their corresponding amino acids in the existence of said long-chain nylon as a toughening agent, wherein a proportion of said long-chain nylon used as the toughening agent in the total weight of the toughened nylon is 2-45%.

14. The toughened nylon according to claim 13, wherein the proportion of said long-chain nylon used as the toughening agent in the total weight of the toughened nylon is 6-25%.

15. The toughened nylon according to claim 13, wherein said cyclic lactam monomer is at least one selected from the group consisting of N-methyl hexanolactam, N-n-octyl nonanolactam, and N-t-butyl dodecanolactam.

16. A preparation process of toughened nylon according to claim 13, the preparation process comprising:
   a dissolution step of said long-chain nylon resin in said lactam monomer or its corresponding amino acid; and
   a polymerization step of said lactam monomer or its corresponding amino acid;
   wherein the dissolution step and the polymerization step are conducted simultaneously, or wherein the dissolution step is performed and then the polymerization step is carried out in a solution obtained from the dissolution step.

17. The preparation process according to claim 16, wherein said polymerization step includes a casting process.

18. The preparation process according to claim 16, wherein said polymerization step includes a casting process, such that the preparation process comprises:
dissolving said long-chain nylon resin in melted cyclic lactam monomer or its corresponding amino acid;
dehydrating;
then adding a catalyst and dehydrating again, raising the temperature to 120-200° C. and adding a catalyst promoter to obtain a resulting contents;
transferring the resulting contents into a preheated mould immediately and carrying out polymerization in an oven at 150-250° C. to obtain the toughened nylon.

19. The preparation process according to claim 16, wherein said polymerization step includes a reacting extrusion process, such that the preparation process comprises:
adding and dissolving said long-chain nylon resin in cyclic lactam monomer or its corresponding amino acid as contents in a first reactor;
dehydrating in vacuum the contents in the first reactor;
in the first reactor, adding a catalyst and continuing the dehydrating in vacuum;
adding cyclic lactam monomer or its corresponding amino acid and a catalyst promoter as contents in a second reactor, and dehydrating in vacuum;
then adding the contents of the first and the second reactors into an extruder for polymerization; and
setting a temperature of polymerization section at 220-250° C. and adjusting a screw speed so that a residence time of material in a screw is 0.5-7 minutes, and the toughened nylon is obtained as an extruded product.

20. The preparation process according to claim 16, wherein said polymerization step includes a hydrolysis polymerization process, such that the preparation process comprises:
adding said long-chain nylon resin to cyclic lactam monomer or its corresponding amino acid;
heating and dissolving;
adding water and conducting hydrolysis polymerization at 200-250° C. and 10-20 MPa;
depressurizing after 0.5-6 hours and dehydrating in vacuum; and
continuing polymerization to further increase viscosity to obtain the toughened nylon.

21. The preparation process according to claim 16, wherein said polymerization step includes reacting extrusion.

22. The preparation process according to claim 16, wherein said polymerization step includes hydrolysis polymerization.

23. The preparation process according to claim 16, wherein said polymerization step includes solid phase polymerization.

24. Gears, bearings, precise instrumental parts and automobile parts comprising the toughened nylon prepared according to claim 13.

* * * * *